United States Patent [19]

Schierling et al.

[11] Patent Number: 5,377,560
[45] Date of Patent: Jan. 3, 1995

[54] DOUBLE-MASS FLYWHEEL

[75] Inventors: Bernhard Schierling, Kürnach; Jörg Sudau, Niederwerrn, both of Germany

[73] Assignee: Fichtel & Sachs AG, Schweinfurt, Germany

[21] Appl. No.: 101,463

[22] Filed: Aug. 2, 1993

[30] Foreign Application Priority Data

Aug. 3, 1992 [DE] Germany .................. 4225605

[51] Int. Cl.⁶ ........................... F16D 3/66
[52] U.S. Cl. ........................... 74/574; 74/572; 192/106.2; 464/68
[58] Field of Search .......... 74/572, 574, 573 R; 192/106.2; 464/68

[56] References Cited

U.S. PATENT DOCUMENTS

| | | | |
|---|---|---|---|
| 5,025,680 | 6/1991 | Umeyama et al. | 74/573 R |
| 5,052,244 | 10/1991 | Kamiya et al. | 192/106.2 X |
| 5,065,642 | 11/1991 | Kagiyama et al. | 464/68 |
| 5,092,820 | 3/1992 | Naudin et al. | 464/68 |
| 5,156,066 | 10/1992 | Janiszewski | 74/572 X |
| 5,209,139 | 5/1993 | Janiszewski | 74/572 X |
| 5,245,889 | 9/1993 | Kohno et al. | 74/573 R |
| 5,307,710 | 5/1994 | Feldhaus et al. | 74/572 X |

FOREIGN PATENT DOCUMENTS 0154088 11/1985 European Pat. Off. .
0529669 3/1993 European Pat. Off. .

*Primary Examiner*—Charles A. Marmor
*Assistant Examiner*—Peter Kwon
*Attorney, Agent, or Firm*—Graves, Donohue & Raymond Brumbaugh

[57] ABSTRACT

In a double-mass flywheel the flywheels of which are coupled with torsional flexibility by at least one set of at least two helical springs (31, 31'), it is proposed that the end spring (31') of the spring set arranged in a channel (29) encircling the axis of rotation (9) of the flywheels in a circular arc is pivoted to control elements (39, 53) of the flywheels via an endshoe (41). For this purpose, the endshoe (41) and the control elements (39, 53) are provided with guide surfaces which have the cross-sectional shape of a circular segment.

15 Claims, 4 Drawing Sheets

DOUBLE-MASS FLYWHEEL

BACKGROUND OF THE INVENTION

The invention relates to a double-mass flywheel to be positioned in the drive train of a motor vehicle powered by an internal-combustion engine.

From DE-A-37 21 712, a double-mass flywheel is known that has two flywheels pivoted relative to each other and coupled to each other with torsional flexibility by a torsional vibration damper. While one of the two flywheels is fixed to the crankshaft of the internal-combustion engine, the second flywheel bears a friction clutch by means of which the gears further down the drive train can be disconnected when the internal-combustion engine is started or a gear change is effected.

In the known double-mass flywheel, the first flywheel contains a channel encircling the axis of rotation, in which several comparatively long helical springs are positioned, each individually controlled through endshoes of the torsional vibration damper. The helical springs are connected parallel to each other but, because of their length, they permit a comparatively large relative angle of rotation between the two flywheels. The channel is at least partially filled with a viscous lubricant in order to reduce friction.

In operation, as a result of compression and centrifugal force and because of their length, the helical springs of the known double-mass flywheel are pressed against that inner wall of the first flywheel which bounds the channel radially outwards. Due to the friction between the helical springs and the inner wall surface, a high basic friction arises between the flywheels, even at low rotational speeds and small angles of twist.

Furthermore, in a double-mass flywheel of the type described above, the use of wedge pieces to bend the long helical springs that are positioned in the channel and, at the points of bending, to give them sliding support against that inner wall of the first flywheel which bounds the channel radially outwards, is known from the German utility model 90 17 936.

In the not prepublished but higher-priority German patent application, DE 41 28 868 (corresponding to the U.S. patent application Ser. No. 07/931 932) it is proposed that the two flywheels be coupled with each other with torsional flexibility, by means of at least one set of helical-spring elements that are separate but connected in series. The circumferentially outermost helical-spring elements are guided in spring pots or endshoes, while the ends of adjacent helical-spring elements that are turned towards each other are guided in sliding shoes. Both the sliding shoes and the endshoes are in turn guided in a channel of one of the flywheels that encircles the axis of rotation of the flywheels.

It has turned out that the endshoes in particular are subjected to high mechanical loading, particularly when an attempt is made to keep the basic friction of the torsional vibration damper low by suitably dimensioning the endshoes.

SUMMARY OF THE INVENTION

The invention provides a double-mass flywheel having a torsional vibration damper that permits a relatively large relative angle between the two flywheels, allows better control of basic friction, and has a long operating life.

The invention is based on a double-mass flywheel, to be positioned in the drive train of a motor vehicle powered by an internal-combustion engine, comprising:
- a first flywheel that can be fixed to a crankshaft of the internal-combustion engine, coaxially with its axis of rotation;
- a second flywheel, pivoted coaxially with the first flywheel, as the carrier of a friction clutch in the drive train,
- a torsional vibration damper coupling the two flywheels to each other with torsional flexibility, with at least one set of at least two helical-spring elements which are arranged in series at a common average diameter in a channel of the first flywheel that encircles the axis of rotation, with several control elements for each circumferentially outer endface of the two circumferentially outermost helical-spring elements of each set, the first control elements of which connect the outermost endfaces to the first flywheel, while the second control elements connect the outermost endfaces to the second flywheel, with a sliding shoe between each pair of adjacent ends of circumferentially adjacent helical-spring elements of the set, for guiding the adjacent ends in the channel, and with an endshoe between the outer endface of each of the two outermost helical-spring elements of each set and the first and second control elements.

In a double-mass flywheel of this type, it is proposed by the invention that the endshoes for the support of the outer endfaces of the outermost helical-spring elements have essentially annular, flat contact surfaces running at least approximately perpendicular to the spring axis of the outermost helical-spring element, and that the endshoes should, on the sides circumferentially distant from their flat contact surfaces, have guide surfaces having the shape of a circular segment in cross-section, and the first and second control elements have counter-guide surfaces having the shape of a circular segment in cross-section, permitting a limited swivelling movement of the endshoes around a swivelling axis that is at least approximately parallel to the axis of rotation of the flywheels.

The fact that the contact surfaces of both the endshoes and the control elements have the shape of a circular segment makes it possible for the endshoes continuously to adapt relative to the control elements, over at least a limited range, so that they fit closely to the control elements in a stable position. By this means, tilting moments are avoided that might have an adverse effect on the characteristics of the helical-spring elements or put excessive mechanical loads on the helical-spring elements and the endshoes. Reduction of the mechanical loading on the endshoes prolongs working life. The helical-spring elements are preferably helical springs separate from each other; the helical-spring elements may, however, be joined to each other in one piece.

In a preferred form, each endshoe displays in its radially outer area relative to the axis of rotation of the flywheels a prolongation which overlaps the outermost helical-spring element over at least part of its radially outward longitudinal extension. The prolongation prevents direct contact between the helical-spring element and the inner wall surface of the channel that bounds the channel radially outwards. The prolongation may here be of such a shape that its inner surface facing the axis of rotation, i.e. its inner contour, is shaped to follow the spring winding contour of the helical element in its compressed state. Prolongations of this-kind are relatively stable, since they have a comparatively large cross-surface area. For another thing, they essentially fill the space between the helical-spring element and the inner wall of the channel, even when the helical spring element is not completely compressed, so that the prolongation can deviate radially only by a small amount. In this way the prolongation of the endshoe, together with a corresponding prolongation of an adjacent sliding shoe, can be exploited as a limit stop for restricting the spring excursion of the outermost helical-spring element, without any problem and without, for example, fear of causing buckling damage to the shoes that are fitted with prolongations.

In a preferred form, the prolongation is intended to be of such a form that, at least in the rest condition of the torsional vibration damper, the outer surface of the prolongation facing away from the axis of rotation is preferably separated by only a small distance from that wall of the first flywheel which bounds the channel radially outwards. When there is a very low torque load on the double-mass flywheel, e.g. in idling operation, complete separation is achieved between the endshoe and the inner wall surface of the channel, and consequently very low system or basic friction.

In operation, the spring element loads the endshoe with a resultant stabilizing force which, depending on changes in the direction of the force relative to the swivelling axis of the endshoe, exerts a tilting moment on the endshoe. The stabilizing force can cut the swivelling axis, particularly when the torsional vibration damper is in the rest position; the outermost helical-spring element, however, can also be supported on the contact surface of the endshoe so that the resultant stabilizing force runs at a distance from the midpoint of the circular-segment-shaped guide surface of the endshoe, i.e. at a distance from the latter's swivelling axis. The tilting moment exerted-on the endshoe in the case of such an eccentric application of the stabilizing force can be used purposefully for fine adjustment of the torsional vibration damper.

The resultant stabilizing force preferably runs on that side of the midpoint of the circular-segment-shaped guide surfaces which faces radially towards the axis of rotation of the flywheels. The effect of this is that friction between the endshoe and the inner wall surface of the channel due to centrifugal force occurs only at higher speeds of rotation. Moreover, increasing torque load on the double-mass flywheel, and the consequent increase in the compression of the helical-spring elements, displaces the rise in friction to even higher speeds of rotation.

Alternatively, it may also be expedient for the resultant stabilizing force to run on that side of the midpoint of the circular-segment-shaped guide surfaces which faces radially away from the axis of rotation of the flywheels. This measure can be used purposefully in order to obtain an intended friction between the prolongation of the endshoe and the inner wall surface of the channel, even when the torque values to be transmitted are small. This friction increases with increasing torque load and with increasing speed of rotation. Such an adjustment of the frictional behaviour might be applied, for example, in the case of high-torque internal-combustion engines having a small number of cylinders.

In a preferred form, the swivelling movement of the endshoe is limited in at least one direction of swivel by stop faces of the endshoe and of the control elements. For this purpose, stop faces are provided on at least one side in the circumferential direction beside the circular-segment-shaped guide surface of the endshoe and in the circumferential direction beside the circular-segment-shaped counter-guide surfaces of the control elements, these stop faces being mutually assigned and departing from the circular in cross-section. If the stop faces are provided for on the side facing the axis of rotation of the flywheels, then, at higher speeds of rotation, e.g. in conjunction with a form of the endshoe that causes the resultant stabilizing force of the helical-spring element to be applied on the same side, the prolongation of the endshoe can be prevented from coming into contact with those coil areas of the helical-spring element which lie radially outwards and so causing uncontrolled friction. The stop faces, particularly the stop faces adjacent to the axis of rotation of the flywheels, are preferably mutually assigned tangential surfaces of the endshoe and of the control elements. This design permits support over a large area together with low surface pressure.

Stop faces provided for on that side of the swivelling axis which faces away from the axis of rotation of the flywheels can protect the endshoe from excessive mechanical loading. For example, the prolongation of the endshoe may lie against the inner wall surface of the channel at high speeds of rotation, while eccentrically applied resultant stabilizing forces of the helical-spring elements introduce additional moments into the section forming the spring contact surfaces. Especially when there is a high torque load on the torsional vibration damper, the foot area of the prolongation is heavily stressed. This applies all the more so if the prolongations of the endshoe and the prolongation of a sliding shoe adjacent to it are together used as limit stops. In its longitudinal direction, i.e. in the circumferential direction of the flywheels, the prolongation is stabilized by stop faces on the endshoe and on the control elements on that side of the swivelling axis which faces away from the axis of rotation of the flywheels, so that collapsing stress on its foot area is avoided. These stop faces may be tangential surfaces of the type already described; it may also be expedient, however, for a lug to be provided on the endshoe, to contact an end area of the control elements.

The circular-segment-shaped guide surface of the endshoe can be concave if the counter-guide surface of the control elements is convex; convex guide surfaces for the endshoe have, however, proved to be more durable.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
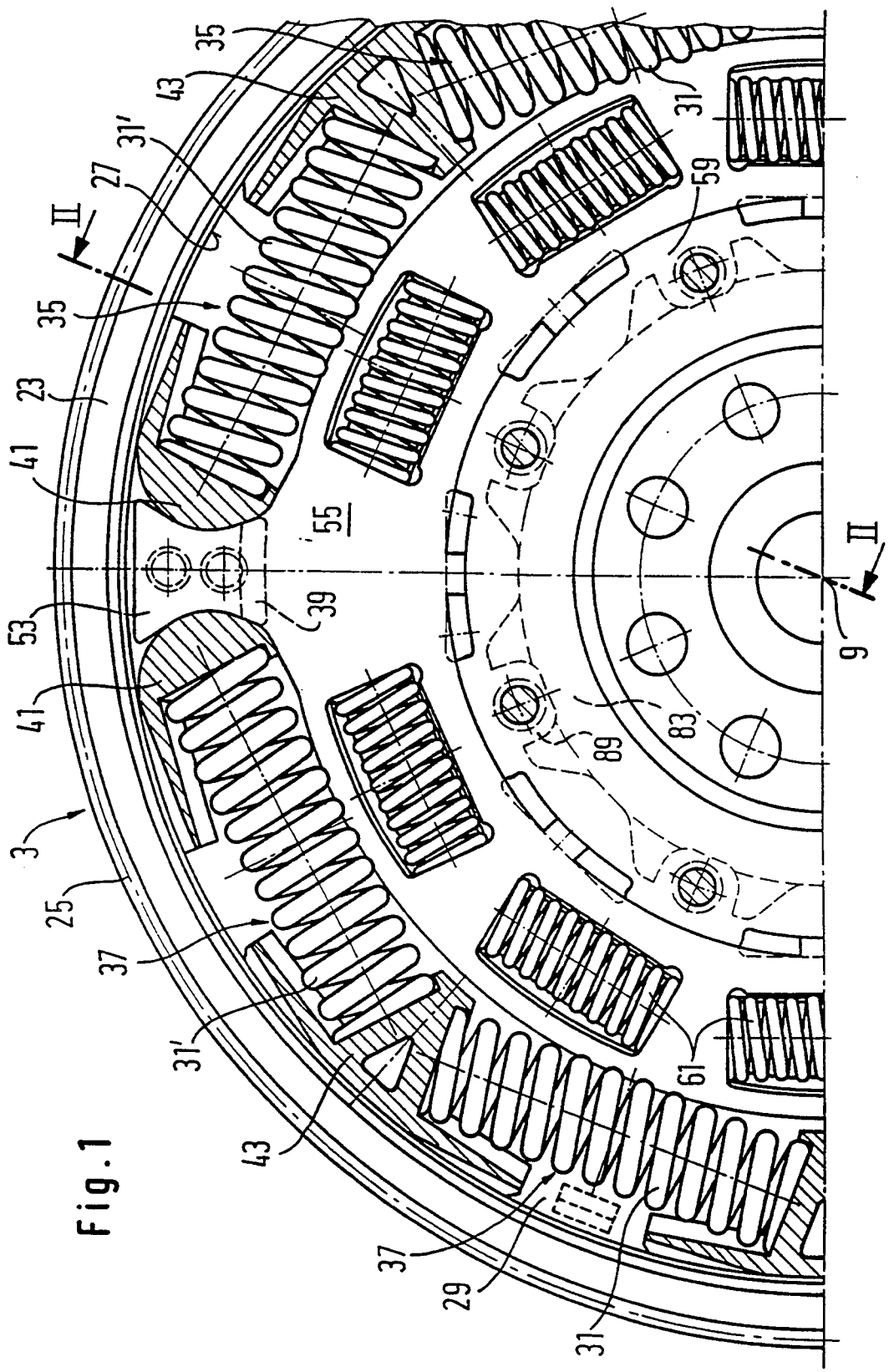
FIG. 1 shows a partial axial section through a double-mass flywheel for the drive train of a motor vehicle.
Figure 2:
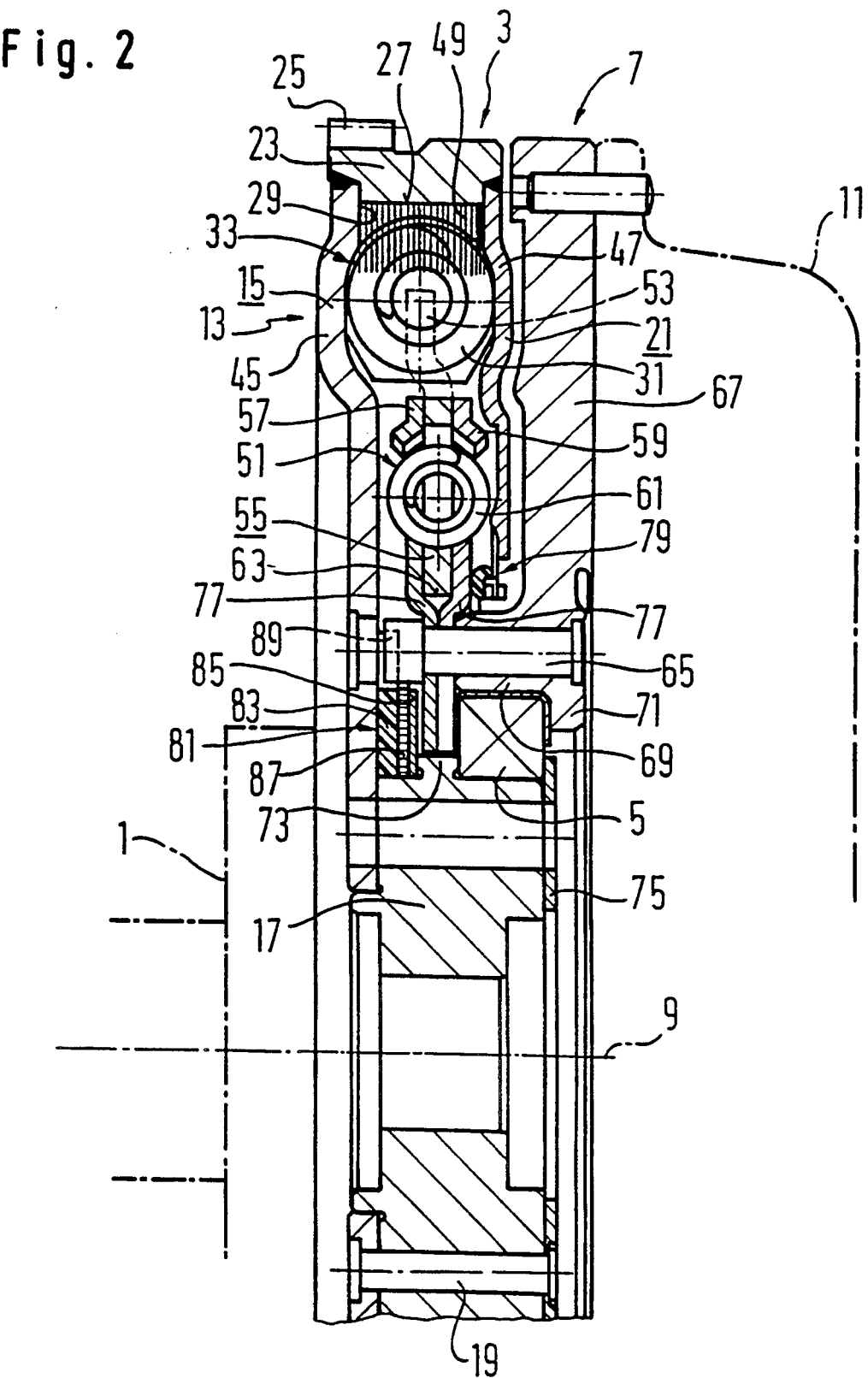
FIG. 2 shows a partial sectional view of the double-mass flywheel, seen along the line II—II in FIG. 1.

FIG. 1 shows a partial axial section through a double-mass flywheel for the drive train of a motor vehicle, the upper half of which is shown in axial longitudinal view in FIG. 2. The double-mass flywheel includes a first flywheel 3 that can be fixed to a crankshaft 1 of the internal-combustion engine; a second flywheel 7 is pivoted on the first flywheel 3 by means of a bearing 5, around a common axis of rotation 9 with the crankshaft 1. The second flywheel 7 is essentially disc shaped and bears a conventional friction clutch, indicated by 11 (FIG. 2), of which it forms the counterthrust plate. A torsional vibration damper 13 couples the two flywheels 3, 7 to each other with torsional flexibility.

The first flywheel 3 is assembled from several parts and includes a primary disc 15, firmly fixed to a hub 17 that is separably fixed to the crankshaft 1 by means of rivets 19. The flywheel 3 further includes a cover disc 21, parallel to the primary disc 15 and positioned a distance away from it, which, in the area of its outer circumference, is firmly connected via a ring 23 to the outer circumference of the primary disc 15. A toothed starter ring 25 is formed on the outside of the ring 23 and in one piece with it. The ring 23, by means of its circularly cylindrical inner wall surface 27 (which is coaxial with the axis of rotation 9), together with the lateral surfaces of the primary disc 15 and the cover disc 21 (which in this area run approximately at right angles to it), bounds a channel 29 running concentrically with the axis of rotation 9. In the channel 29 the helical springs 31 of a first spring stage 33 of the torsional vibration damper 13 are positioned. As is best seen from FIG. 1, the first spring stage 33 includes two identical spring sets 35, 37, arranged laterally reversed and parallel to each other in the torque transmission path.

The spring sets 35, 37 are actuated by the first flywheel 3 through control elements or segments 39 which are so arranged on the inner sides of the primary disc 15 and the cover disc 21 that, when each has an endshoe 41 (FIG. 1) inserted in series with it, they act on the end springs (labelled 31') of each spring set 35, 37. The individual springs 31 of each spring set 35, 37, formed as cylindrical helical springs, are mutually supported circumferentially via sliding shoes 43. The sliding shoes 43 lie with their radially outer area against the inner wall surface 27 of the ring 23. As shown particularly by FIG. 2, the annular channel 29 formed by the ring 23, the primary disc 15 and the cover disc 21 is of such a form in the axial direction that it receives and guides the springs 31. In the present case, the primary disc 15 and cover disc 21 are provided with bulges 45, 47 so that the channel 29 is somewhat narrower radially outside and radially inside the springs 31. It is also possible, however, to form the channel 29 without difficulty by means of flat walls of the primary disc 15 and cover disc 21, running parallel to each other. As indicated by 49, the space 29 is filled with a viscous medium that serves in particular as a lubricant to reduce the friction between components that can move relative to each other.

A second spring stage 51 is arranged radially within the area of the first spring stage 33 and is controlled by a hub disc 55 coupled to the endshoes 41 of the spring sets 35, 37 through lugs 53. The lugs 53 form control elements connected to the second flywheel 7. In the specimen model illustrated, the hub disc 55 has two radially projecting lugs 53 which extend in between each pair of adjacent endshoes 41 and which, when the vibration damper 13 is in the rest position, overlap the segments 39 in the axial direction. On both sides of the hub disc 55, two lateral discs 57, 59 are arranged, coupled with torsional flexibility to the hub disc 55 by springs 61 which are held in windows in both the hub disc 55 and the lateral discs 57, 59. The hub disc 55 has an aperture 63, centred with the axis of rotation 9, into which the two lateral discs 57, 59 are deformed towards each other and in which those areas of the two lateral discs 57, 59 lying within the aperture 63 lie flat against each other. In this area, the lateral discs 57, 59 are also firmly fixed with rivets 65 to a plate section of the second flywheel 7 that forms a counterthrust plate 67 of the clutch 11. In the area of the riveted joint, the counterthrust plate 67 has a shoulder 69, projecting axially towards the primary disc 15, with which the counterthrust plate 67 is set on the bearing 5 and is axially fixed. For axial fixing in one direction, the counterthrust plate 67 bears a radial flange 71, in one piece with it, while, in the other axial direction, it is fixed by the radially inner area of the two lateral discs 57, 59, which lie flat against each other here. The bearing 5 is axially fixed on the hub 17 by a radially projecting flange 73 of the hub 17 and by a disc 75 riveted to the hub 17 by means of the rivets 19.

In the area in which they are deformed into the aperture 63 of the hub disc 55, each of the two lateral discs 57, 59 forms a surrounding edge 77, on which the hub disc 55 is radially guided.

In the space between the radially inwards end area of the cover disc 21 and the flange 69 of the counterthrust plate 67, a seal 79 is arranged which prevents the egress of the viscous material 49 and the ingress of dirt.

On the side facing axially away from the bearing 5, a frictional device 81 is arranged in the area in which the lateral discs 57, 59 lie flat against each other; in the specimen model illustrated, this consists of a friction disc 83, an axially acting spring 85 and an intermediate disc 87, and is clamped between the flange 73 and the primary disc 15. The frictional device 81 is designed for operation under load and does not take effect until a predefined relative angle of rotation has been reached between the two flywheels 3, 7, for which purpose the friction ring 83, with play in the circumferential direction, is coupled to heads of the rivets 65 by extensions 89.

Figure 3:
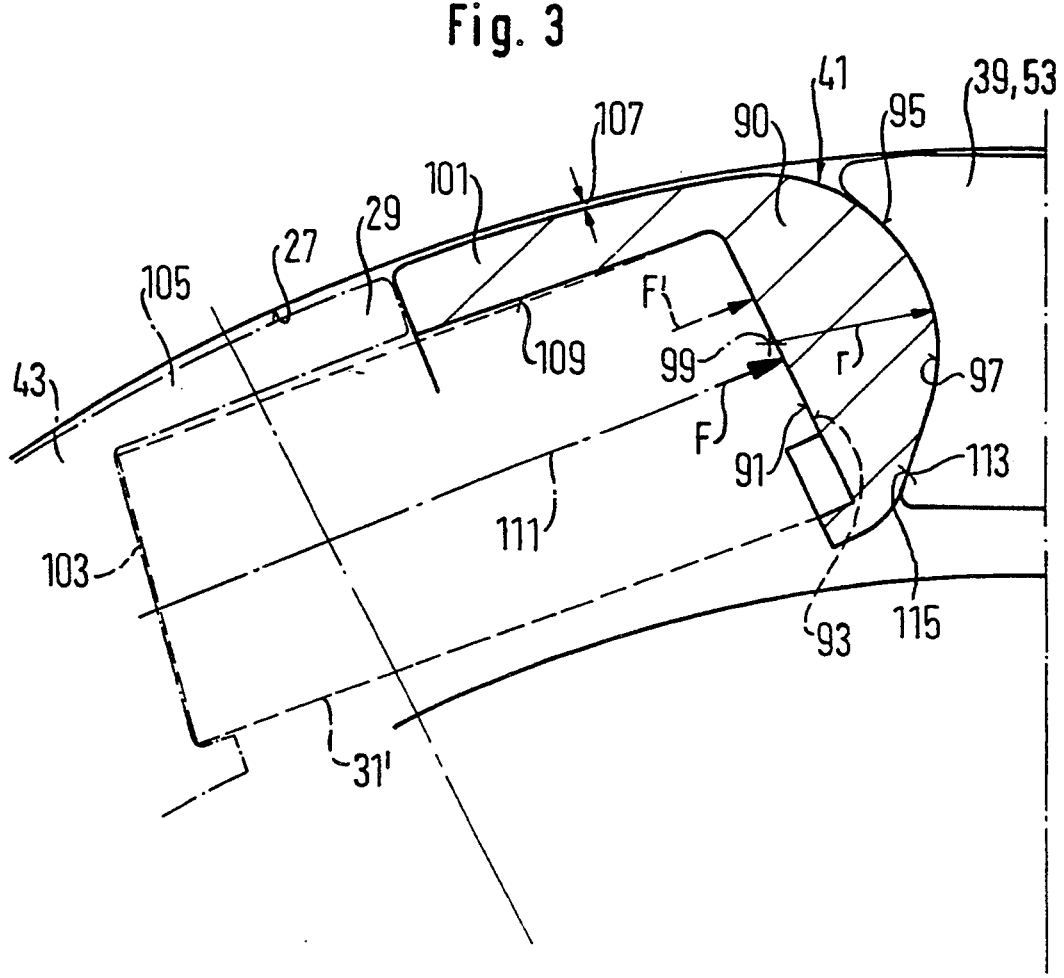
FIG. 3 shows a detail view of an endshoe of the double-mass flywheel.

FIG. 3 shows details of the endshoe 41 that is supported against the control elements of the flywheels 3, 7, i.e. on the segments 39 and the lug 53. The end spring 31' is indicated by dotted lines in its fully compressed form. The endshoe 41 has a base body 90 with an essentially annular spring contact surface 91, against which the endface 93 of the end spring 31' lies. On the side circumferentially facing away from the spring contact surface 91, the base body 90 is provided with a convex cylindrical, i.e. in cross-section circular-segment-shaped, guide surface 95, which engages with a concave counter-guide surface 97, similarly circular-segment-shaped in cross-section, of the segments 39 and of the lug 53. The guide surfaces 95, 97 have a radius r around a central axis, labelled 99, parallel with the axis of rotation 9, around which the endshoe 41 can be swivelled relative to the segments 39 and the lug 53.

On the radially outer side of the base body 90 of the endshoe 41, the side facing away from the axis of rotation of the flywheels, a prolongation 101 sticks out in the circumferential direction and partly overlaps the end spring 31'. As indicated in FIG. 3 with alternating dot-dash lines, the sliding shoe 43 guiding the other end 103 of the end spring 31' also has a prolongation 105 sticking out in the circumferential direction and partly overlapping the end spring 31'. Those ends of the prolongations 101, 105 which are turned towards each other form stop faces that limit the spring excursion of the end spring 31'. Since altogether all endshoes 41 and sliding shoes 43 are provided with that type of prolongation, these prolongations determine the maximum relative angle of rotation of the flywheels 3, 7.

The swivelling guidance permits the endshoes 41 to adapt themselves in correspondence with the instantaneous loading due to a resultant stabilizing force F of the end spring 31' applied thereto. In this way, the mechanical stress on the endshoe 41 is largely reduced, which in turn contributes to an extension of service life. The swivelling mounting of the endshoes 41 further permits a reduction in the basic friction of the torsional vibration damper and a deliberate influence to be exerted on the frictional behaviour depending on the speed of rotation and the torque that is to be transmitted by the torsional vibration damper.

The endshoe 41 is so dimensioned that, when the torsional vibration damper is in the rest condition, i.e. when the end spring 31' is essentially relaxed, the endshoe runs at a distance from the inner wall surface 27 of the channel 29, forming a slit 107. Frictional contact between the prolongation 101 and the inner wall surface 27, which would increase basic friction, is thus prevented. At a sufficiently high speed of rotation, on the other hand, the prolongations 101 can swivel against the inner wall surface 27 due to centrifugal force, causing the friction to be increased.

The inner surface 109 facing towards the axis of rotation of the flywheels 3, 7 in general follows the coil contour of the end spring 31' in the radial outer area with a comparatively small gap, which prevents the coils of the end spring 31' rubbing against the prolongation 101. where the spring excursion of the end spring 31' is used up or nearly used up the prolongation 101 essentially completely fills the space between the end spring 31' and the inner wall surface 27 so that, in spite of the use of the prolongation 101 as a limit stop, the prolongation 101 can deviate radially by only a very small amount, which reduces the risk of damage to the endshoe 41.

The resultant force F with which the end spring 31' is supported by the spring contact surface 91 runs approximately in the direction of the spring axis 111 of the end spring 31'. The spring axis 111 is so arranged that it runs on that side of the central axis 99 facing towards the axis of rotation of the flywheels 3, 7 and thus exerts a moment on the endshoe 41 seeking to move the prolongation 101 radially inwards, away from the inner wall surface 27. The guide surfaces 95, 97 which, in cross-section, have the shape of a circular segment, continue tangentially, so that these tangential surfaces 113, 115 form stop faces which limit the swivelling travel of the endshoe 41 around the central axis 99. In the specimen model illustrated, the swivelling moment generated by the force F clamps the tangential surface 113 of the base body 90 against the tangential surfaces 115 of the segments 39 or the lug 53. In this way, at least at low speeds of rotation, a stable adjustment of the endshoe 41 is achieved in which the endshoe 41 remains at a distance 107 from the inner wall surface 27. The swivelling moment increases with increasing torque loading on the torsional vibration damper, so that, when a high torque is to be transmitted, the slit 107 can maintain the gap 107 even up to medium speeds of rotation.

It can be understood that the dimensioning of the endshoe 41 and the line of application of the force F can also, where appropriate, be selected in such a way that the tangential surfaces 113, 115 do not lie against each other in the rest position, so that the endshoe 41 can deviate in both swivelling directions.

For reasons of adaptation it can be necessary to cause the force exerted by the end spring 31' to the endshoe 41 to be applied on the radially outward side of the central axis 99 on the base body, as indicated by F'. With such adaptation, the slit 107 can be used up even when torque loading of the torsional vibration damper is low, so that, depending on the torque and the speed of rotation, a frictional moment can be deliberately generated.

Figure 4:
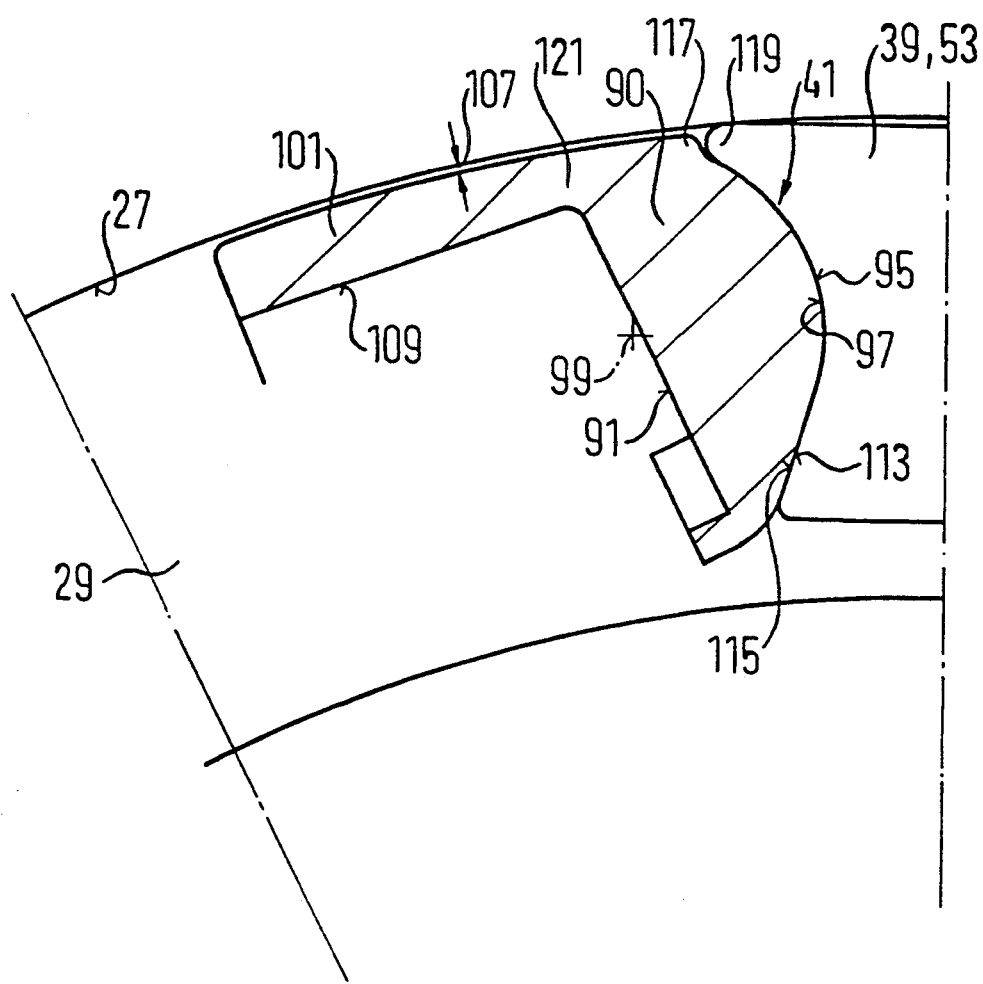
FIG. 4 shows a sectional view of a variant form of the endshoe in FIG. 3.

FIG. 4 shows a variant form of the endshoe from FIG. 3, in which the swivelling mobility of the endshoe is limited by stop faces in both swivelling directions. Components corresponding with the arrangement in FIG. 3 are indicated by the reference numbers of FIG. 3; for the purpose of explanation, reference is made to the description of FIG. 3. In addition to the tangential stop faces 113, 115, a rib or lug 117 is formed on that side of the central axis 99 facing radially away from the axis of rotation of the flywheels. The lug 117 is provided in the area of the inner wall surface 27 of the channel 29 on the base body 90 of the endshoe 41 and acts concurrently with an end area 119 of the segments 39 or the lug 53. The lug 117 admittedly does not limit the swivelling movement until the prolongation 101 rests on the inner wall surface 27. By this means it is achieved that impact forces originating in the limitation of the spring excursion and operating on the prolongation 101 in the circumferential direction of the channel 29 do not load or bend the foot area 121 of the prolongation 101. This is particularly applicable to forms of implementation in which the force of the end spring is applied radially outside the central axis 99 on the base body 90.

While specific embodiments of the invention have been shown and described in detail to illustrate the application of the inventive principles, it will be understood that the invention may be embodied otherwise without departing from such principles.

What we claim is:

1. Double-mass flywheel to be positioned in the drive train of a motor vehicle powered by an internal-combustion engine, comprising:
    a first flywheel (3) to be secured on a crankshaft of the internal-combustion engine, coaxially with its axis of rotation (9),
    a second flywheel, pivoted coaxially relative to the first flywheel (3), in the form of a carrier of a friction clutch (11) in the drive train,
    a torsional vibration damper (13) coupling the two flywheels (3, 7) to each other with torsional flexibility, said torsional vibration damper (13) comprising at least one set (35, 37) of at least two helical-spring elements (31) which are arranged in series at a common average diameter in a channel (29) of the first flywheel (3) that encircles the axis of rotation (9),
    several control elements (39, 53) for each circumferentially outer endface (93) of the two circumferentially outermost helical-spring elements (31') of each set (35, 37), first control elements (39) of which connect the outermost endfaces (93) to the first flywheel (3), while second control elements (53) of which connect the outermost endfaces (93) to the second flywheel (7), a sliding shoe (43) between each pair of adjacent ends (103) of circumferentially adjacent helical-spring elements (31) of the set (35, 37), for guiding the adjacent ends (103) in the channel (29), and an endshoe (41) between the outer endface (93) of each of the two outermost helical-spring elements (31') of each set (35, 37) and the first (39) and second (53) control elements, the endshoes (41) for the support of the outer endfaces (93) of the outermost helical-spring elements (31') having essentially annular, flat contact surfaces (91') running at least approximately perpendicular to the spring axis (111) of the outermost helical-spring element (31')

and further the endshoes (41), on the sides circumferentially distant from their flat contact surfaces (91), having guide surfaces (95) having the shape of a circular segment in cross-section, and the first (39) and second (53) control elements having counter-guide surfaces (97) having the shape of a circular segment in cross-section, permitting a limited swivelling movement of the endshoes (41) around a swivelling axis (99) that is at least approximately parallel to the axis of rotation (9) of the flywheels (3, 7).

2. Double-mass flywheel as in claim 1, wherein each endshoe (41) has, in its radially outer area relative to the axis of rotation (9) of the flywheels (3, 7), a prolongation (101) which overlaps the outermost helical-spring element (31') over at least part of its radially outward longitudinal extension.

3. Double-mass flywheel as in claim 2, wherein the prolongation (101) is of such a form that its inner surface (109) facing towards the axis of rotation (9) essentially follows the contour of the helical element (31') in its compressed state.

4. Double-mass flywheel as in claim 2, wherein the prolongation (101) is so formed that, at least when the torsional vibration damper (13) is in the rest condition, its outer surface facing away from the axis of rotation (9) is at a distance from a wall (27) of the first flywheel (3) which bounds the channel (29) radially outwards.

5. Double-mass flywheel as in claim 2, wherein at least that sliding shoe (43) adjacent to the endshoe (41) has a prolongation (105) overlapping the outermost helical-spring element (31') radially outwards over part of its longitudinal extension and wherein the prolongations (101, 105) of the endshoe (41) and of the sliding shoe (43) form stop faces that limit the spring excursion of the outermost helical-spring element (31').

6. Double-mass flywheel as in claim 2, wherein the outermost helical-spring element (31') is supported against the contact surface (91) of the endshoe (41) such that its resultant stabilizing force runs at a distance from the midpoint (99) of the circular-segment cross-section guide surface (95) of the endshoe (41).

7. Double-mass flywheel as in claim 6, wherein the resultant stabilizing force runs on that side of the centrepoint (99) which faces radially towards the axis of rotation (9) of the flywheels (3, 7).

8. Double-mass flywheel as in claim 6, wherein the resultant stabilizing force runs on that side of the centrepoint (99) which faces radially away from the axis of rotation (9) of the flywheels (3, 7).

9. Double-mass flywheel as in claim 2, wherein stop faces (113, 115; 117, 119) are provided on at least one side in the circumferential direction beside the circular-segment cross-section guide surface (95) of the endshoe (41) and in the circumferential direction beside the circular-segment cross-section counter-guide surfaces (97) of the control elements (39, 53), the stop faces being mutually assigned and departing from the circular in cross-section and limiting the swivelling movement of the endshoe (41) around its swivelling axis (99).

10. Double-mass flywheel as in claim 9, wherein at least the one stop face of the endshoe (41) is formed as a tangential surface (113) to the circular-segment cross-section guide surface (95).

11. Double-mass flywheel as in claim 10, wherein at least the one stop face of the control elements (39, 53) is formed as a tangential surface (115) to the circular-segment cross-section counter-guide surface (97) and is matched to the tangential surface (113) of the endshoe (41).

12. Double-mass flywheel as in claim 10, wherein the tangential surface (113) of the endshoe (41) is provided for on that side of the circular-segment cross-section guide surface (97) which circumferentially faces the axis of rotation (9).

13. Double-mass flywheel as in claim 9, wherein at least the one stop face of the endshoe (41) is formed as a lug (117) which strikes against an end area (119) of the control elements (39, 53).

14. Double-mass flywheel as in claim 1, wherein the circular-segment cross-section guide surface (95) of the endshoe (41) is convex and the circular-segment cross-section counter-guide surfaces (97) of the control elements (39, 53) are concave.

15. Double-mass flywheel as in claim 1, wherein the helical-spring elements (31) of each set are formed as helical springs separate from each other.

* * * * *